Patented Dec. 5, 1939

2,182,535

UNITED STATES PATENT OFFICE 2,182,535

SOUND ABSORBENT PLASTIC COMPOSITIONS

John Guy Britton, Lansdowne, Pa.

No Drawing. Application September 15, 1937,
Serial No. 163,954

9 Claims. (Cl. 106—29)

The purpose and effect of my invention is to provide means for facing any surface to suppress reflection of sound therefrom, for instance, the exposed interior surfaces of inclosures in which it is desired to suppress reflection of sounds made in such inclosures, for instance, rooms in which broadcasting is effected.

As hereinafter described, I provide a dry powdered composition, which, by mere mixture with water, becomes plastic so that it may be molded to form rigid tiles or panels, which may be applied to the surfaces aforesaid, or which may be applied in a plastic state to such surfaces on which it will quickly set to form a solid tenacious durable sound absorbent facing.

As hereinafter described, the composition includes chemically inert filler material, preferably, comminuted bagasse reduced to fibers of approximately one sixty-fourth of an inch in diameter and one-eighth of an inch in length, or any other cellulosic material which has the property of initially absorbing water and readily and rapidly releasing it in the form of vapor when subjected to a temperature of approximately 100° F. Such filler material is mixed with ingredients miscible with water to form a binder for it.

As a binder for such filler material, I employ a mixture of oxid and chlorid of the same metal, preferably magnesium, in such a state that when dry it will pass all through a screen having twenty meshes per inch.

I include in said binder a material, miscible with water, capable of holding occluded air in the composition until it sets; preferably animal glue of the quality indicated by 440 to 550 Bloom gram gel test.

In order to make a tile one inch thick and twelve inches square when set and dried, I may employ materials in the following proportions, by weight:

| | Ounces |
|---|---|
| Water | 20 |
| Bagasse | 5 |
| Magnesium oxid | 8 |
| Magnesium chlorid | 8 |
| Glue | ⅛ |

I soak the bagasse in the water until it is saturated, then add the glue and stir the mixture occasionally until the glue is completely dissolved. I then add the dry powdered oxid and chlorid to the aqueous mixture, stirring the latter until all of the ingredients are thoroughly wet. If the plastic composition thus made be poured into a mold or applied to a surface with a trowel, it will set in rigid form and forms an excellent heat insulation, but, the rigid material thus formed is not sufficiently porous to afford the desired quality of sound insulation. Such quality can only be imparted to the mixture aforesaid by subjecting it to a whipping beating action such as is employed in beating eggs or the ingredients to form ice cream.

Therefore, after forming the aqueous mixture of the plastic composition as above described, I place it in an apparatus resembling an ice cream freezer, without any refrigerating means, but containing rotary paddles which may be rapidly operated, preferably by an electric motor, to whip the mixture and beat into it a large percentage of atmospheric air thus largely increasing its volume. When the volume of the beaten mixture has been increased approximately fifty per cent greater than its volume when the ingredients thereof are merely stirred together; it may be poured into suitable molds to form tiles or panels of the desired size, or applied with a trowel directly to the surface to be faced, and sets in rigid form in about eight hours if merely exposed to the atmosphere.

However, the rigid molded articles aforesaid retain a considerable portion of the water which it is necessary to eliminate to impart to them the desired porosity and consequent capacity for sound absorption. Therefore, I initially subject such molded articles to a dry atmosphere at a temperature of approximately 100° F. for about two hours. The elimination of moisture from the product aforesaid is facilitated by blowing air thereon and preferably therethrough by means of an electrically operated fan, with the effect of reducing the weight of such a tile to twenty-four ounces, by eliminating from its mass all of the uncombined water ingredient thereof including the water initially absorbed by the bagasse, and the vaporization of the water from the latter facilitates the chemical reaction required in the binder and consequently increases the strength of the plastic composition in its final rigid form.

When thus treated; the product is from twenty-five to thirty-three per cent lighter in weight than if the ingredients thereof were mixed by merely stirring them, and the rigid material whether applied directly to a surface in plastic form or molded to form rigid panels or tiles before being applied to the surface to be insulated, has a capacity of absorbing sound to the amount of seventy per cent of the sound vibrations which are caused to impinge upon the exposed surface of the rigid plastic material.

That product is about the color of ivory and has pores substantially like fine bread, and may be readily coated with paint by a brushing or spraying operation such as ordinarily employed in coating a plaster wall.

However, a composition which sets in a few minutes so that it may be handled in the form of tiles or panels and which, when set, is more porous and whiter than the composition above described and, consequently, may be used as a wall facing without any paint or other coating, may be formed of materials in the following proportions by weight:

|  | Ounces |
| --- | --- |
| Water | 11 |
| Fuller's earth | 4 |
| Magnesium oxid | 8 |
| Magnesium chlorid | 9 |
| Sodium bicarbonate | 6 |

In the latter composition, the sodium bicarbonate is a substitute for the glue, which, when dissolved in the reduced quantity of water has the capacity to hold occluded air in the composition until it is set; but it should be added after the other ingredients are mixed. Thereupon, the latter mixture should be subjected to the whipping, beating process above described, until the volume of the beaten mixture has been increased approximately fifty per cent greater than its volume when its ingredients are merely stirred together. It may then be poured into suitable molds or applied with a trowel directly to the surface to be faced, and sets in rigid form in a few minutes if merely exposed to the atmosphere, and has such porosity and color as coarse white bread.

The manufacture and sale of sound absorbent material for facing walls is now highly competitive, and my invention is of great advantage in the production of such facings of minimum weight, but maximum porosity and consequent absorbent capacity, at minimum cost per unit of area.

It is characteristic of my improved sound absorbent material, made as above described, that it is so extremely porous that a person may easily blow tobacco smoke through the one inch thick panels or tiles aforesaid. Its texture resembles that of sponge rubber except that it is rigid and the tortuous air passages therethrough are smaller in diameter, being formed by rupture of the occluded air bubbles primarily held by the liquid portion of the mixture. Moreover, as is well known to those skilled in the art, such material made as above described is flame-proof and infusible.

Although I have described what I believe to be preferable forms of my invention; I note that a mixture of oxid and chlorid of the same metal, other than magnesium, for instance zinc, may be employed as a binder for the inert filler. Moreover, other materials, for instance wheat or rye flour, may be substituted for the glue or bicarbonate but produce products which are less porous and of greater specific gravity.

Therefore, I do not desire to limit myself to the specific materials, proportions, or method of utilizing the same herein set forth, as it is obvious that various modifications may be made therein without departing from the essential features of my invention as defined in the appended claims.

I claim:

1. The method of forming a rigid, flame-proof and infusible, sound absorbent plastic composition, which consists in mixing approximately five parts of comminuted dry bagasse fiber with twenty parts of water; adding one and one-half parts of animal glue to the mixture when the bagasse is saturated with water; adding eight parts of dry magnesium oxid and eight parts of dry magnesium chlorid to the mixture, when the glue has been completely dissolved; thoroughly mixing said ingredients by stirring the mass thereof; then beating the mass with a whipping action such as is employed in beating eggs, until the volume of the mass is increased approximately fifty per cent by occlusion of atmospheric air therein; then disposing the resultant plastic composition in the form in which it is desired that it shall set; allowing the mass to remain quiescent until it has set in rigid form by chemical reaction; then eliminating the residue of moisture from the product by the application of heated air thereto.

2. The method of forming a rigid, flame-proof and infusible, sound absorbent plastic composition, which consists in mixing approximately five parts of comminuted cellulosic material with twenty parts of water; adding one and one-half parts of adhesive to the mixture; adding eight parts of dry magnesium oxid and eight parts of dry magnesium chlorid to the mixture, when the adhesive has been dissolved; thoroughly mixing said ingredients by stirring the mass thereof; then beating the mass with a whipping action such as is employed in beating eggs, until the volume of the mass is largely increased by occlusion of atmospheric air therein; then disposing the resultant plastic composition in the form in which it is desired that it shall set; allowing the same to remain quiescent until it has set in rigid form by chemical reaction; then eliminating the residue of moisture from the product by the application of heated air thereto.

3. The method of forming a rigid, flame-proof and infusible, sound absorbent plastic composition, which consists in mixing approximately five parts of comminuted dry cellulosic material with twenty parts of water; adding one and one-half parts of adhesive to the mixture; adding eight parts of dry oxid and eight parts of dry chlorid, of the same metal, to the mixture; thoroughly mixing said ingredients by stirring the mass thereof; then beating the mass with a whipping action such as is employed in beating eggs, until the volume of the mass is largely increased by occlusion of atmospheric air therein; then disposing the resultant plastic composition in the form in which it is desired that it shall set; allowing the mass to remain quiescent until it has set in rigid form by chemical reaction; then eliminating the residue of moisture from the product by the application of air thereto.

4. A rigid, flame-proof and infusible, sound absorbent plastic composition including eight parts each of oxid and chlorid of the same metal, five parts of comminuted bagasse fiber, one and one-half parts of glue, and twenty parts of water, and comprising approximately fifty per cent voids, formed by occluded air.

5. A rigid, flame-proof and infusible, sound obsorbent plastic composition including eight parts each of oxid and chlorid of the same metal, five parts of comminuted cellulosic material, one and one-half parts of glue, and twenty parts of water, and comprising approximately fifty per cent voids, formed by occluded air.

6. A rigid, flame-proof and infusible, sound absorbent structure, residue of a primarily liquid plastic composition including eight parts each of oxid and chlorid of the same metal, five parts of comminuted bagasse fiber, one and one-half parts of glue, and twenty parts of water, from which the water has been eliminated by desiccation, and comprising approximately fifty per cent voids, formed by occluded air, and forming tortuous air passages through the structure.

7. A rigid, flame-proof and infusible, sound absorbent structure, residue of a primarily liquid plastic composition including eight parts each of oxid and chlorid of the same metal, five parts of comminuted cellulosic material, one and one-half parts of glue, and twenty parts of water, from which the water has been eliminated by desiccation, and comprising approximately fifty per cent voids, formed by occluded air, and forming tortuous air passages through the structure.

8. The method of forming a light and very porous rigid, flame-proof and infusible, sound absorbent plastic composition, which consists in mixing comminuted organic cellulosic material with water; adding thereto a binder for said cellulosic material including magnesium oxid and magnesium chlorid and glue; thoroughly mixing said ingredients by stirring the mass thereof; and thereafter beating the mass with a whipping action such as is employed in beating eggs, until the volume of the mass is largely increased by occlusion of atmospheric air therein; then disposing the resultant plastic composition in the form in which it is desired that it shall set; allowing the mass to remain quiescent until it has set in rigid form by chemical reaction; and then eliminating the residue of moisture from the product.

9. The method of forming a light and very porous rigid, flame-proof and infusible, sound absorbent plastic composition, which consists in mixing comminuted cork with water; adding thereto a binder for that cellulosic material including magnesium oxid and magnesium chlorid and glue; thoroughly mixing said ingredients by stirring the mass thereof; and thereafter beating the mass with a whipping action such as is employed in beating eggs, until the volume of the mass is largely increased by occlusion of atmospheric air therein; then disposing the resultant plastic composition in the form in which it is desired that it shall set; allowing the mass to remain quiescent until it has set in rigid form by chemical reaction; and then eliminating the residue of moisture from the product.

JOHN GUY BRITTON.